United States Patent [19]

Bosco et al.

[11] Patent Number: 5,164,003

[45] Date of Patent: Nov. 17, 1992

[54] ROOM TEMPERATURE CURABLE SURFACE COATING AND METHODS OF PRODUCING AND APPLYING SAME

[75] Inventors: Paul N. Bosco, Fort Lee; Terrance Fay, Vernon, both of N.J.

[73] Assignee: Ceram Tech International, Ltd., Pomona, N.Y.

[21] Appl. No.: 500,779

[22] Filed: Mar. 28, 1990

[51] Int. Cl.$^5$ .................. C09D 1/00; C09D 1/02
[52] U.S. Cl. .................. 106/287.1; 106/286.8; 106/287.14; 106/287.15; 106/287.16; 106/600; 106/605
[58] Field of Search ............ 524/588, 445, 451; 106/14.21, 605, 626, 632, 634, 282.19, 287.16, 287.34, 286.8, 287.1, 287.15; 501/12

[56] References Cited

U.S. PATENT DOCUMENTS

| | | | |
|---|---|---|---|
| 3,389,002 | 6/1968 | Huffcut | 106/626 |
| 3,432,312 | 3/1969 | Feagin et al. | 106/287.34 |
| 3,454,410 | 7/1969 | Schutt et al. | |
| 3,492,137 | 1/1970 | Iler | |
| 3,493,401 | 2/1970 | Schutt et al. | |
| 3,620,784 | 11/1971 | Schutt | 106/634 |
| 3,689,300 | 9/1972 | Bunger et al. | 106/287.34 |
| 3,706,603 | 12/1972 | Vessey et al. | |
| 3,721,574 | 3/1973 | Schneider et al. | |
| 3,973,998 | 8/1976 | Datta et al. | |
| 3,977,888 | 8/1976 | Sano et al. | |
| 4,036,655 | 7/1977 | Yamada et al. | |
| 4,125,651 | 11/1978 | Campbell et al. | |
| 4,162,169 | 7/1979 | Schutt | 106/634 |
| 4,172,110 | 10/1979 | Caesar et al. | |
| 4,235,836 | 11/1980 | Wassell et al. | 106/605 |
| 4,288,252 | 9/1981 | Neely | |
| 4,312,673 | 1/1982 | Neely, Jr. | |
| 4,347,285 | 8/1982 | Batdorf | |
| 4,466,832 | 8/1984 | Yoshimura et al. | 106/634 |
| 4,479,824 | 10/1984 | Schutt | 106/14.21 |
| 4,802,921 | 2/1987 | Motoki | 106/605 |
| 4,906,297 | 3/1990 | Breen | 106/634 |

FOREIGN PATENT DOCUMENTS 596611  3/1978  U.S.S.R. .................. 106/287.34

OTHER PUBLICATIONS

Stanley B. Lasday, "Ceramic Refractory Coatings—Their Application and Performance", Industrial Heating-Dec. 1982, pp. 38-39, plus unnumbered page.
Stanley B. Lasday, "Nature of Ceramic Coatings and Their Benefits in Thermal Processes", Industrial Heating-Aug. 1982, pp. 49-51, plus unnumbered page.

Primary Examiner—Theodore Morris
Assistant Examiner—David M. Brunsman
Attorney, Agent, or Firm—Weil, Gotshal & Manges

[57] ABSTRACT

A silica-based coating for, and a method for coating glass, metal, ceramic, and plastic surfaces by forming single cross-linked O-Si-O polymer chains. The coating generally comprises a binder and a filler. The binder is a mixture of silica-based polymers, colloidal silica, and metal oxide particles in an aqueous suspension. It includes four main ingredients: an alkali metal silicate; silica gel; a cross-linking agent such as methyltrimethoxysilane or tetraethoxysilane; and water. After curing, the binder forms an amorphous layer that binds the fillers to the surface. The protective coating is formed at room temperature, without the addition of energy in any form. The fillers are chosen to provide the coating with mechanical strength, abrasion resistance, and increased corrosion resistance. Fillers may also be chosen to modify the coating's dielectric constant, to improve the coating's surface lubricity, and to alter the coating's thermal coefficient of expansion. Typical fillers include clay, wollastonite, nepheline syenite, talc, flint, ceramic fibers, metallic fibers, ceramic microspheres, glass microspheres, cerium dioxide, and dichromium trioxide.

20 Claims, No Drawings

ROOM TEMPERATURE CURABLE SURFACE COATING AND METHODS OF PRODUCING AND APPLYING SAME

FIELD OF THE INVENTION

This invention relates to silica-based coatings which bond to most surfaces and can be cured at room temperature to form amorphous ceramic matrices. These protective coatings may be applied to metal, ceramic, glass, or polymer surfaces. The coatings form an amorphous ceramic matrix upon drying at room temperature.

BACKGROUND

Coatings are often used to protect surfaces against wear and corrosion. The coatings are generally composed of binders, fillers, and other ingredients. The binders, upon curing, bind the fillers and other ingredients to each other and to the substrate. The fillers are added principally as reinforcing agents; to increase corrosion resistance; to increase abrasion resistance; to increase surface lubricity; and/or to increase the load of total solids (which increases the coating's dried-to-wet ratio and, therefore, reduces the drying shrinkage and the resultant stress cracks). Other ingredients are added to modify physical properties of the surface, such as its color (e.g., the pigment in a paint).

Coatings bond to a surface by means of coupling agents. Coupling agents form bonds between the binder in the coating and the surface to be coated. They can also contribute to the cohesive strength of coatings comprising polymer chains by cross-linking the polymer chains. The use of organosilanes as coupling agents is discussed in an article by Barry Arkles entitled "Silane Coupling Agent Chemistry," which was published in "Silicone Compounds Register and Review (S-7)," by R. Anderson, B. Arkles, and G. L. Larson (Petrach Systems, 1987), and in an article by Warde T. Collins entitled "Adhesion Promoters," which was published as Chapter 10 in "Handbook of Coatings Additives," edited by Leonard Kelbo (Marcel Dekker, 1987). The latter article is distributed by Dow Corning as Brochure No. 24-481-87.

Silica-based coatings known in the art have silica to alkaline-metal-oxide molar ratios in the binder no higher than 6.5:1. These coatings require the application of heat to bind to the surfaces of the material being coated. Moreover, these coatings do not form true amorphous ceramic matrices at room temperature.

SUMMARY OF THE INVENTION

This invention provides novel non-toxic ceramic coatings which can be used on glass, metal, ceramic, plastic, and other surfaces to protect these surfaces against wear and corrosion. These ceramic coatings may be designed to have a low dielectric constant. Moreover, these protective water-based coatings can be air-dried at room temperature, without the application of any additional energy in any form. The coatings are generally over 95% dry within 24 hours, and dry completely in six days at room temperature.

The specific composition of the coatings can be varied to closely match a property of the substrate, such as its thermal expansion coefficient, or to match the coating to a particular application. A wide range of fillers and active ingredients may be included in the coatings to engineer the surface properties for a particular application. For example, specific fillers may be chosen to improve the surface lubricity, abrasion resistance, or chemical resistance. Certain fillers exhibit increased heat resistance, or can best withstand large temperature changes.

The binders used in the coatings of the present invention are not true solutions. They are mixtures of soluble ionic and covalent silica-based polymers, colloidal silica, and possibly metal-oxide particles in an aqueous suspension. The binder provides the flexibility, the bonding properties, some of the thermal and chemical resistance, and the integrity of the coating.

The following definitions should be ascribed to the terms listed below, as used in this specification and in the appended claims:

"Alkali metal silicate", as used herein, means essentially alkali metal silicate.

"Cerium dioxide", as used herein, means essentially cerium dioxide.

"Cross-linking agent", as used herein, means an agent which links one polymer chain to another.

"Dichromium trioxide", as used herein, means essentially dichromium trioxide.

"Glass", as used herein, means essentially glass.

"Lithium silicate", as used herein, means essentially lithium silicate.

"Metal" or "metallic", as used herein, means essentially metal or essentially metallic.

"Methyltrimethoxysilane", as used herein, means essentially methyltrimethoxysilane.

"Organo-functional silane", as used herein, means a silicon-containing compound in which an organic radical that does not hydrolyze attaches with a single bond to the silicon atom, and hydrolyzable radicals typically attach to the silicon atom with the other three silicon bonds. However, up to three non-hydrolyzable groups (and one hydrolyzable group) may attach to a single silicon atom. Organo-functional silanes can be represented by the chemical formula $R_nSiX_{(4-n)}$ where R is the nonhydrolyzable organic radical, and $0 \leq n \leq 3$. It possesses a functionality which enables the coupling agent to bond with organic resins and polymers, metals, inorganic materials, and/or obtain specific properties (e.g., hydrophobicity). The X group is a hydrolyzable group such as an alkoxy, acyloxy, amine, or chlorine.

"Plastic" means essentially plastic.

"Potassium silicate" means essentially potassium silicate.

"Silica gel" essentially silica gel.

"Sodium silicate" means essentially sodium silicate.

"Tetraethoxysilane" means essentially tetraethoxysilane.

It is an object of the present invention to provide improved silica-based coatings, and processes for making and applying such coatings.

More specifically, a first object of the present invention is to provide a silica-based coating which chemically bonds without heating to most surfaces, including glass, metal, plastic, ceramic, and other surfaces.

A second object of the present invention is to provide a silica-based coating which can be cured at room temperature to form an amorphous ceramic matrix.

A third object of the present invention is to provide a silica-based coating which can be tailored to have specific properties, such as a high emissivity, or a low dielectric constant.

A fourth object of the present invention is to provide protective ceramic coatings that are non-toxic and can be easily applied to many types of surfaces, including metal, plastic, glass, and ceramic surfaces.

A fifth object of the present invention is to provide chemically resistant amorphous alkali metal silicate coatings.

A sixth object of the present invention is to provide methods for producing the above enumerated protective coatings.

These and other objects of the invention are achieved with the present invention, which is described in detail below and in the appended claims.

DETAILED DESCRIPTION OF THE INVENTION

The coating according to the present invention is formed by combining a binder, a filler, and, in some cases, active ingredients. The volume percent of the binder is between 15 and 88%, the volume percent of the filler is between 12 and 80%, and the volume percent of the active ingredients is between 0 and 55%. For applications which require especially strong bonding, the preferred binder concentration range is 80%-88%. Preferred concentration ranges for the filler include 75-80%, 45-50%, and 18-24%.

Binder

The binder is a mixture of soluble ionic and covalent silica-based polymers, colloidal silica, and metal oxide particles in an aqueous suspension. When the binder dries, it forms an amorphous layer which binds the fillers and the active ingredients together and to the substrate. The binder functions by combining silicon dioxide with a cross-linking agent and an alkali metal oxide.

The binder has four main ingredients: an alkali metal silicate such as potassium silicate, sodium silicate or lithium silicate; silica gel; a cross-linking agent such as methyltrimethoxysilane (MTMS), tetraethoxysilane (TEOS) or any other organo-functional silane; and water. The ratios of the four components is significant. The quantities of the alkali metal silicate, the silica gel and the cross-linking agent must be such that the molar ratio of silicon dioxide to metal oxide in the binder is between 8.5:1 and 6.6:1. Ratios much above 8.5:1 result in gelation, while ratios below 6.6:1 weaken the coating's resistance to solvents. Note that these are the ratios in the binder itself. These are not the ratios in the final product, which may include silicon dioxide or metal oxides in the other coating ingredients.

The silicon dioxide in the binder is preferably provided by the alkali metal silicate, the silica gel, and, in some preferred embodiments, the cross-linking agent. Dichromium trioxide and cerium dioxide are often added as fillers but may also function as cross-linking agents, in which case they would be part of the binder as well as part of the filler. Their presence has some beneficial effect on the coatings. In particular, dichromium trioxide with a particle size of 0.5 microns and smaller has been found to aid in bonding to the substrate and to increase thermal shock resistance. Other metal oxides and hydroxides may also function similarly.

When MTMS is used as the cross-linking agent in the binder, it reacts with water, releasing methanol and complexing the resulting silanol with other binder constituents forming essentially single cross-linked O-Si-O polymer chains. This differs from the usual double cross-linked oxygen bond for silicon dioxide. The bonds form differently because the fourth silicon bond is unavailable, since it has been captured by the methyl group. The normal double cross-linked bond for silicon dioxide makes the polymer harder but much less flexible. The enhanced flexibility of the coating provided by the present invention allows the coating to retain its integrity as it dries at room temperature.

The order of combining the constituents may affect the properties of the final coating, at least for low turbulence mixing of the constituents. When MTMS is added to the potassium silicate before the silica gel, and low turbulence mixing is used, the coating formed is more water/alkali resistant but less flexible than the coating formed when the potassium silicate solution and silica gel are combined before adding MTMS.

Higher levels of MTMS result in a more resistant but less flexible coating which is thought to have less thermal stability because the methyl groups will oxidize off the polymers at some temperature and the larger amounts will generate more gases and require more accommodation within the polymer structure.

The nature of the silica gel suspension is also very important. Experiments were done using three sizes for the $SiO_2$ particles in the silica gel suspension: Remet SP30 gel which has a 7-8 micron average particle size; DuPont Corp Ludox AM silica gel which has a 12 micron average particle size; and DeGussa Corporation K328 silica gel which has a 30 micron average particle size. The use of the larger particle sizes resulted in a softer, more flexible coating because the silica gel did not dissolve completely, so that $SiO_2$ particles remained in suspension. The average distance between particles increased and the actual ratio of $K_2O$ to $SiO_2$ in the solution itself increased since more of the silica was in the bulk of the silica gel particles.

Increasing the ratio of silica gel to potassium silicate raises the $SiO_2/K_2O$ ratio while maintaining an essentially constant solids level and, therefore, increases the brittleness of the coating.

In one preferred embodiment of the invention, potassium silicate is used as the alkali metal silicate, and MTMS is used as the cross-linking agent. More thermally stable and/or hydrophobic groupings may be substituted for the MTMS. Increased hydrophobicity and size of the organic group on the silane in theory will improve performance since this will result in less penetration by aqueous material for the same concentration of pores and the same pore sizing. Phenyl silane and trifluoropropyl silane oligomer are possible substitutes. Phenyl silane when substituted completely for MTMS formed a binder which was very water repellent and did not dissolve in boiling water. Trifluoropropyl silane oligomer should also form a very hydrophobic surface. Combinations of these compounds may also be effective as cross-linking agents.

Tetraethoxysilane (TES) is a possible substitute for at least part of the silica gel. Generally, reducing silica gel particle size improves the binder by making it more uniform, making it bond better and making it more stable. The major impediment to using TES is its production of alcohol, and the reduction of the water content of the binder that causes gelation as the TES level is increased. This problem can be overcome by combining TES with silica gel or by adding ions which hinder gelation, or both. It is also possible to substitute an oligomeric silane having fewer hydrolysis products than monomeric silanes and replace the silanes' hydrolyzable group with non-alcohol groups. Halogen and acetate terminated groups yield acids and disilazane groups yield ammonia. Some combination of these may be suitable.

The addition of transition metal oxides may be beneficial if they can be incorporated in sol/gel form compatible with the coating. These oxides could substitute in part for the potassium in the binder. The transition metals form multivalent covalent bonds, unlike potassium which forms monovalent ionic bonds. Thus the addition of transition metal oxides can affect the coating's hardness, flexibility, and chemical resistance. Initial work has been done using various salts or oxides of cerium, chrome, titanium, tungsten, molybdenum, nickel, cobalt, zinc, boron, copper and manganese. These may best be used in colloidal dispersions so that the pH can be balanced by combining acid and base materials. Another approach to incorporating the metal oxides would be to suspend them in surfactant/chellating agents or to start with organometallic compounds or complexes such as metallic soaps or quaternary ammonium complexes.

A preferred formulation for a binder having an $SiO_2$ to $K_2O$ molar ration of 7.4 is:
62.4% by weight Kasil 1 from Philadelphia Quartz
1.32% by weight MTMS
36.3% by weight Remasol SP30
No water is added during the preparation stage to the water already in the Kasil and Remasol. After the binder is made, it may be diluted with water for ease of mixing and spraying.

As noted above, dichromium trioxide may function as a binder, although it always functions as a filler. It may be added to the above formulation at a molar ratio of $Cr_2O_3$ to $SiO_2$ in the binder of 0.267 to 1.07. The amount of $Cr_2O_3$ used is dictated by its role as a filler: it depends upon the particular application, and upon the other filler constituents.

Filler

Fillers are added to the binder to improve the physical properties of the coatings. Because the filler constituents are usually larger than the binder constituents, their surface chemistry is less important. The shape and size of the filler particles is important. Spherically shaped particles allow maximum solids loading but there is some trade-off in porosity and coating viscosity. Platelet- and fiber-shaped particles may be added to reinforce the coating's ability to handle both internal forces (such as drying stresses) and externally applied forces. However, they can only be used at relatively low levels since they increase the coatings' viscosity and porosity. Hollow microspheres can be used to reduce the density and modify properties such as the dielectric constant of the coatings.

The particle size will affect the hardness and the uniformity of the coating. It must also be compatible with the desired coating thickness. In some formulations, fillers such as nepheline syenite are used because they have specific chemical interactions with other components at high temperature and are useful for high temperature coatings.

The filler requirements for the coating can be further optimized by determining the best particle size distributions of the filler particles for a particular application. Furthermore, other filler materials with better physical and chemical properties for a particular application can be found.

The preferred fillers used, along with the permissible volume ranges, include:

| | |
|---|---|
| Dichromium Trioxide (may also have some solubility in potassium silicate and usefulness as a cross-linking agent) | 0–60 |
| Cerium Dioxide (may also have some solubility in potassium silicate and usefulness as a cross-linking agent) | 0–60 |
| Titanium Dioxide (may also have usefulness as a cross-linking agent) | 0–60 |
| Clay | 0–50 |
| Nepheline Syenite | 0–50 |
| Wollastonite | 0–50 |
| Talc | 0–50 |
| Flint | 0–50 |
| Alumina (80 mesh) | 0–30 |
| Glass Flakes (borosilicate or soda-lime glasses) | 0–15 |
| Reinforcing Agents | 0–50 |
| ceramic fibers and/or platelets | |
| metallic fibers and/or platelets | |
| organic fibers and/or platelets | |
| Ceramic Microspheres | 0–50 |
| Alumina/Silica microspheres (Zeeospheres 200, 600 and 800 grades from Zeelan Industries) | |
| Glass Microspheres (S60/10000 grade from 3M Corporation). | |

Dichromium trioxide and titanium dioxide are used to improve the bonding of the coating to the substrate. Dichromium trioxide provides excellent resistance to chemical corrosion and abrasion. Both dichromium trioxide and titanium dioxide are relatively hard, chemically inert substances. The preferred concentration range for dichromium trioxide and titanium dioxide is 0%, or 2%–15%, although coatings have been prepared with $Cr_2O_3$ concentrations of about 40% and 60%. Cerium dioxide is used to alter the electronic properties of the coating, as well as to cross-link the polymer chains in the binder. It provides extremely strong adhesive and cohesive bonds which are chemically inert and heat resistant. Its preferred concentration range is 0%, or 0.5–2%. Clay, nepheline syenite, and flint are used to provide a hard coating which is thermally resistant. The preferred concentration range for clay is 0%, or 3%–15%; for nepheline syenite (preferred size: grade 200), 0%, or 2%–10%; for flint, 0%, or 5%–30% (preferred size: —325 mesh). The mixture of these materials is adjusted for the particular application, e.g., to closely match the substrate's coefficient of thermal expansion. Kentucky ball clay functions as a plasticizer at high temperatures. Flint helps raise the ratio of solids to liquids in the coating preparation. Wollastonite is a fibrous material that provides increased tensile strength. High tensile strength is critical during the curing stage, as well as in normal use. The preferred concentration range for wollastonite is 0% or 2–12%. Talc is in platelet form, which allows the coating to slip. The preferred concentration range for talc is 0%, or 2%–12%.

As noted above, fibers give the coating tensile strength. Microspheres give the coating compressive strength and hardness. The preferred concentration range is 0%, or 2%–15% for ceramic fibers, and 0%, 15%–25%, and 50%–65% for ceramic microspheres. Alumina has been used as a filler at a concentration of about 27.5%.

Active Ingredients

Active ingredients may be added to the coatings to provide the surface with a particular physical property. The active ingredients differ from the fillers because their purpose is not to improve the mechanical or chemical properties of the material, such as abrasion or corrosion resistance, but to affect, for example, the optical, electrical, and heat transfer properties of the surface. For example, the appearance, emissivity, or electrical conductivity of the surface may be adjusted by adding active ingredients.

Application

The coatings are typically applied using air spray guns or similar devices. The coatings can also be applied by dipping the substrates in the coating, or by painting the coating on the substrate. The guns can use either pressurized or suction feed systems. The surface to be coated must be clean. If it is contaminated with an organic material such as cutting oil, that material must first be removed using a low boiling-point solvent, or an aqueous detergent solution. Most metal, glass, and ceramic surfaces require surface preparation such as sand-blasting using ASTM 60-mesh alumina grit, to remove surface oxides before the coating is applied. Removing the surface oxides is necessary to allow the coating to bond properly to the surface. The coatings must usually be applied within five hours of the surface preparation, otherwise the surface oxides may regrow. Some of the coatings are poorly wetted by water, making it difficult to apply successive coatings. However, the coatings can also be engineered so that successive coatings can be readily applied.

Curing

Shrinkage and cracking problems are minimized with the use of these coatings. The coatings dry at room temperature, i.e., at any temperature between 40° F. and 110° F. The curing process can be characterized as having three basic phases. The initial drying phase lasts 15-20 minutes. Approximately 90% of the water content of the coating evaporates during this phase. The second phase lasts about 24 hours. From 5%-10% of the water evaporates during this phase. At the end of the second phase, the ceramic-metal bond has not set. Thus almost all of the coating shrinkage occurs prior to the setting of the ceramic-metal bond. This minimizes the formation of microcracks in the coating. The third phase, during which the ceramic-metal bond sets as the remaining 1%-5% of the water evaporates, lasts up to 6 days. After these three phases there is no further significant water loss or coating shrinkage.

Sources

The chemicals used to practice this invention can be obtained from the following sources, although it will be appreciated that comparable chemicals can be obtained from other sources:

Ceramic Fibers — Carborundum Corp., Niagara Falls, N.Y.

Cerium Dioxide — Unocal Molycorp, White Plains, N.Y.

Colloidal suspensions of silica gel — Remet Corporation of Chadwick, N.Y. as Remet Remasol SP 30; from Dupont Corporation, Wilmington, Del. as Ludox; Nalco Industries, of Naperville, Ill., as Nalcoag 1130.

Dichromium Trioxide — Ceramic Color and Chemical Co., New Brighton, Pa., as #434 Chrome Oxide Green; Cometals, Inc., New York, N.Y. as green chrome oxide, grade 1.

Flint — Ceramic supply Corp., Lodi, N.J.

Glass Flakes — Owens-Corning, Toledo, Ohio.

Kentucky Ball Clay — Kentucky-Tennessee Clay Co., Mayfield, Ky., as OM-4 Kentucky Ball Clay.

Methyltrimethoxysilane (MTMS) — Union Carbide, Danbury, Conn., as methyltrimethoxysilane A163.

Microspheres — Zeelan Industries, St. Paul, Minn. as Zeeospheres and Zeeolites; 3M Corp, St. Paul Minn., as microspheres S60/10000.

Nepheline Syenite — Indusmin, Inc., of Columbus, Ohio.

Organo-functional silanes — Union Carbide, Danbury, Conn.; Dow Corning, Midland, Mich.; Huls America, Bristol, Pa.

Potassium silicate — the Philadelphia Quartz Company, Valley Forge, Pa., as Kasil 1 which is 8.3% (by weight) $K_2O$ and 20.8% $SiO_2$.

Talc — R.T. Vanderbilt Co., Norwalk, Conn. as Nytal 100HR.

Tetraethoxysilane (TEOS) — Huls America, Bristol, Pa.; PCR, Inc., of Gainesville, Fla.

Titanium Dioxide — Grade R900-28, from DuPont Corporation, Wilmington, Del.

Wollastonite — R.T. Vanderbilt Co., Norwalk, Conn. as Vansil W Wollastonite.

EXAMPLE 1

This composition was specifically formulated for enhanced flexibility and thermal shock resistance on various metals.

189 grams of a 29.1% by weight solution of potassium silicate was put in water having an $SiO_2:K_2O$ molar ratio of 3.93:1 (2.5 weight ratio) in a 600 mL container and slowly agitated. 109.8 grams of a 30% by weight solution of aqueous silica gel was added to the starter silicate solution while the agitation was continued. The resultant mixture had an $SiO_2\ K_2O$ molar ratio of 7.39:1 (4.6 weight ratio). 18 grams (4.23 w %) of OM-4 Kentucky Ball Clay was gradually added to the potassium silicate solution and mixing was continued for approximately 15 minutes. Then 8 grams (1.88 w %) of cerium dioxide, 25 grams (5.87%) of chromium trioxide, 25 grams (5.87%) of wollastonite, 10 grams (2.35%) of nepheline syenite, 12 grams (2.82 w %) of talc, and 25 grams (5.87 w %) of flint were added. The agitation was increased to 300-500 RPM and 4 grams (0.94 w %) of methyltrimethoxysilane were slowly added to the existing mixture (final total $SiO_2$ to $K_2O$ molar ratio was 7.4:1). Mixing was continued for 30 minutes (hydrolysis probably reached 90% after 15 minutes but the mixture was still curing 24 hours later), and the coating was filtered through a 120 mesh screen before being applied. A carbon steel substrate was prepared by sand blasting with ASTM 60 mesh alumina grit. The coating was then applied to the carbon steel substrate with a Binks Model 2001 Air Spray gun at a pressure of about 30 psi g. This coating has also been applied to metal substrates such as aluminum, stainless steel, hastalloy, and titanium in the same manner, as well as to glass, brick, ceramic, polyester, epoxy, and polyimide substrates.

This coating composition is very resistant to thermal shock on carbon steel up to very high temperatures. However, it is not as resistant to alkali/high temperature water exposure and experiences microcracking on curing. X-ray diffraction analysis of this coating showed that it formed an amorphous ceramic layer on the substrate.

EXAMPLE 2

This coating is specifically formulated for high use temperatures over a wide range of metallic and ceramic substrates. It is a modified version of the coating described in Example 1 that more closely matches the thermal coefficient of stainless steel and some other metals at high temperatures.

189 grams of a 29.1% by weight solution of potassium silicate in water having an $SiO_2:K_2O$ molar ratio of 3.93:1 (2.5 weight ratio) was put into a 600 mL container and slowly agitated. 109.8 grams of a 30% by weight solution of aqueous silica gel was slowly added to the starter silicate solution while the agitation was continued. The resultant mixture had an $SiO_2:K_2O$ molar ratio of 7.39:1 (4.6 weight ratio). 18 grams (4.79 w %) of OM-4 Kentucky Ball Clay was added gradually to the potassium silicate solution and mixing was continued for a period of 15 minutes. 8 grams (2.13 w %) of cerium dioxide, 25 grams (6.65 w %) of dichromium trioxide, 10 grams (2.66 w %) of nepheline syenite, and 12 grams (3.19 w %) of talc was then added. The agitation was increased to 300-500 RPM and 4 grams (1.06 w %) of methyltrimethoxysilane was added to the existing mixture. The final total $SiO_2:K_2O$ molar ratio in the binder was 7.4:1. Mixing was continued for 30 minutes (hydrolysis probably reached 90% after 15 minutes, but was probably still curing 24 hours later), and the coating was filtered through a 120 mesh screen before application.

This coating has been successfully applied to aluminum, carbon steel, stainless steel, hastalloy, titanium, glass, brick, ceramic, polyester, epoxy, and polyimide surfaces.

EXAMPLE 3

This coating is a modified version of the coatings described in Examples 1 and 2. This coating is designed to have very low porosity (with residual pores under several microns in diameter) and essentially no microcracking.

189 grams of a 29.1% by weight solution of potassium silicate in water having an $SiO_2:K_2O$ molar ratio of 3.93:1 (2.5 weight ratio) was put in a 600 mL container and slowly agitated. The agitation was increased to 300-500 RPM, and 4 grams of methyltrimethoxysilane was slowly added to the starter potassium silicate solution. Mixing was continued for 15 minutes. 109.8 grams of a 30% weight solution of aqueous silica gel was slowly added to the silicate mixture while agitation was continued for an additional 15 minutes. The resultant mixture had an $SiO_2:K_2O$ molar ratio of 7.4:1. 100 grams (14.32 w %) of dichromium trioxide was slowly added to the potassium silicate solution and mixing continued 15 minutes. 25 grams (3.58 w %) of ceramic fibers, 48 grams (6.87 w %) of talc, 222.4 grams (31.85 w %) of ceramic microspheres, and 104.6 grams (15 w %) of water were then added. Mixing was continued for 30 minutes and the coating filtered through a 120 mesh screen before application.

While this coating is slightly less flexible than the coating of Example 1, it has almost the same thermal shock resistance on steel and aluminum. It has been successfully coated on 12" long carbon steel channels, heated to incandescence, sprayed with concentrated hydrochloric acid, then reheated and quenched in cold water without cracking or peeling. The coating has also been applied to aluminum, titanium, carbon steel, stainless steel, hastalloy, silver, ceramic, epoxy, glass, brick, fiberglass-reinforced phenolic resin, polyester, polyimide, and phenolic surfaces. X-ray diffraction analysis of this coating revealed that it formed an amorphous ceramic layer on the substrate. Mechanical tests of this coating showed that it had a flexion strength of about 20 MPa (megapascals), a Young's Modulus of about 13,000 MPa, and a tensile strength of about 4 Mpa. The coefficient of thermal expansion of this coating was about $5 \times 10^{-6}/°C$. This value is greater than typical values for ceramic materials, a very important advantage since it allows the coating to more closely approximate the coefficient of thermal expansion of metal substrates.

The invention has been described in greatest detail with respect to certain preferred embodiments and specific examples. However, the invention is not limited to those embodiments and examples, and is only limited in scope by the appended claims.

What is claimed is:

1. An amorphous ceramic coating, comprising a silica-based binder and a filler, said coating chemically bonding at room temperature to surfaces selected from the group consisting of glass, metal, ceramic and plastic, wherein said binder and filler comprise 2-60 volume percent dichromium trioxide, and said dichromium trioxide has an average particle size no greater than 0.5 microns.

2. The amorphous ceramic coating as set forth in claim 1, wherein said silica-based binder comprises a cross-linking agent consisting of methyltrimethoxysilane.

3. The amorphous ceramic coating as set forth in claim 1, wherein said silica-based binder comprises a cross-linking agent selected from the group consisting of tetraethoxysilane and a mixture of methyltrimethoxysilane and tetraethoxysilane.

4. The amorphous ceramic coating as set forth in claim 1, wherein said silica-based binder comprises a cross-linking agent selected from the group consisting of alkyltrialkoxysilane, aromatictrialkoxysilane, tetraalkoxysilane, and mixtures thereof.

5. The amorphous ceramic coating as set forth in claim 1, wherein said silica-based binder comprises a cross-linking agent consisting of an organo-functional silane.

6. The amorphous ceramic coating as set forth in claim 1, wherein said silica-based binder comprises an alkali metal silicate.

7. The amorphous ceramic coating as set forth in claim 6, wherein said alkali metal silicate is selected from a group consisting of potassium silicate, sodium silicate, and lithium silicate.

8. The amorphous ceramic coating as set forth in claim 6, wherein said silica-based binder comprises silica gel.

9. The coating as set forth in claim 1, wherein said filler comprises dichromium trioxide at a concentration of 2-15 volume percent, clay at a concentration of 3-15 volume percent, nepheline syenite at a concentration of 2-10 volume percent, ceramic fibers at a concentration of 2-12 volume percent, talc at a concentration of 2-12 volume percent, flint at a concentration of 5-30 volume percent, and ceramic microspheres at a concentration of 15-25 volume percent or 50-65 volume percent.

10. An aqueous suspension, comprising a silica-based binder, dichromium trioxide, and a filler, said silica-based binder comprising an alkali metal silicate, silica gel, and a cross linking agent, said aqueous suspension being suitable for forming a coating, said coating being formed upon application to a surface and curing, said suspension further comprising 2-60 volume percent dichromium trioxide, said dichromium trioxide having an average particle size no greater than 0.5 microns.

11. The coating formed upon application to a surface and curing as set forth in claim 10, wherein said silica-based binder comprises alkali metal oxides, O-Si-O polymer chains, and silanol radicals.

12. The coating as set forth in claim 11, wherein said alkali metal silicate is potassium silicate.

13. The coating as set forth in claim 11, wherein said alkali metal silicate is selected from the group consisting of sodium silicate and lithium silicate.

14. The coating as set forth in claim 11, wherein said cross-linking agent comprises methyltrimethoxysilane.

15. The coating as set forth in claim 11, wherein said cross-linking agent comprises tetraethoxysilane.

16. The coating as set forth in claim 11, wherein said cross-linking agent is selected from the group consisting of alkyltrialkoxysilane, aromatictrialkoxysilane, and tetraalkoxysilane, and mixtures thereof.

17. The coating as set forth in claim 11, wherein said cross-linking agent is an organo-functional silane.

18. The coating as set forth in claim 11, wherein said filler comprises dichromium trioxide at a concentration of 2-15 volume percent, clay at a concentration of 3-15 volume percent, nepheline syenite at a concentration of 2-10 volume percent, ceramic fibers at a concentration of 2-12 volume percent, talc at a concentration of 2-12 volume percent, flint at a concentration of 5-30 volume percent, and ceramic microspheres at a concentration of 15-25 volume percent or 50-65 volume percent.

19. The coating as set forth in claim 11, wherein said filler comprises clay at a concentration of 3-15 volume percent, nepheline syenite at a concentration of 2-10 volume percent, and talc at a concentration of 2-12 volume percent.

20. The coating formed upon application to a surface and curing as set forth in claim 10, wherein the molar ratio of the total amount of $SiO_2$ to alkali metal oxide in the binder is between 6.5 and 8.1.

* * * * *